July 3, 1962
W. KEMPF
3,042,148
LUBRICATING DEVICE FOR JOINTS OF UNIVERSAL
JOINT SHAFTS AND THE LIKE
Filed Nov. 27, 1959
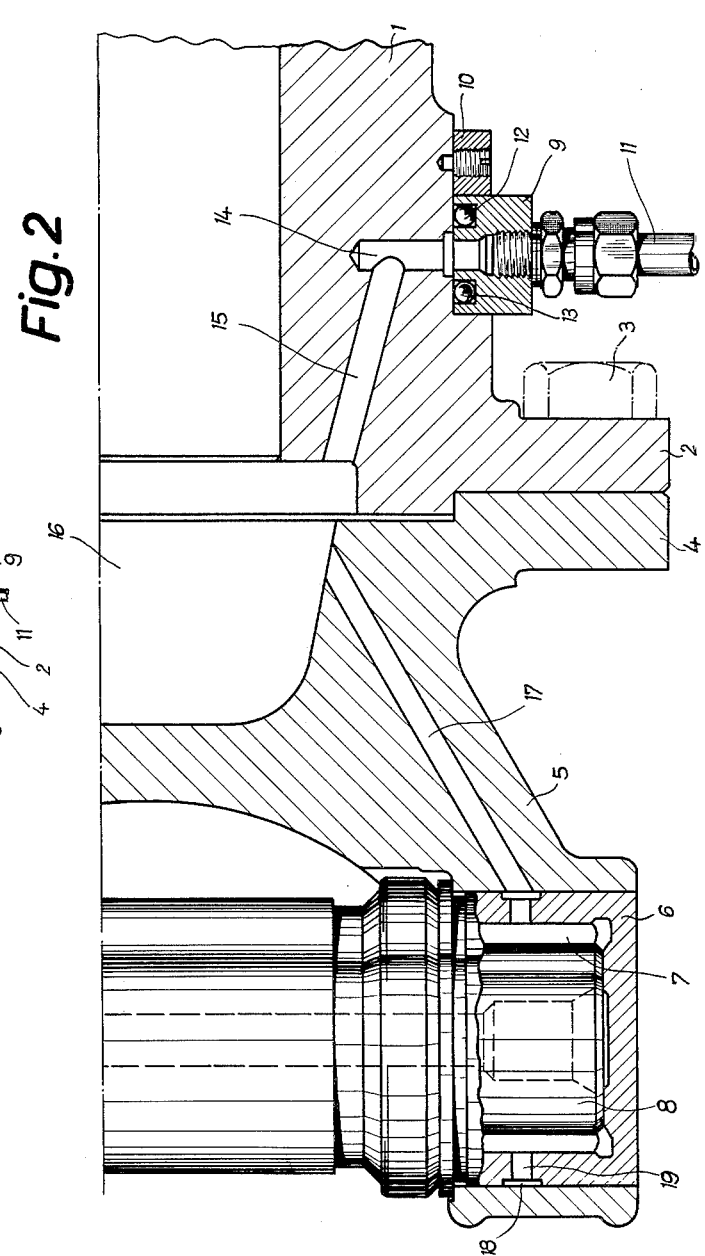
INVENTOR.
Willi Kempf
BY
Patent Agent.

3,042,148
LUBRICATING DEVICE FOR JOINTS OF UNIVERSAL JOINT SHAFTS AND THE LIKE
Willi Kempf, Essen, Germany, assignor to Gelenkwellenbau G.m.b.H., Essen, Germany
Filed Nov. 27, 1959, Ser. No. 855,604
Claims priority, application Germany Nov. 27, 1958
2 Claims. (Cl. 184—6)

The present invention relates to a lubricating device for joints of universal joint shafts and the like. The supply of lubricant to the rotating joint pins or pivots is frequently difficult inasmuch as a considerable number of bores has to be provided.

It is, therefore, an object of the present invention to provide a lubricating device for joints of universal joint shafts and the like, which will overcome the above mentioned drawback.

It is a further object of this invention to provide a lubricating system for joints of universal joint shafts and the like, which will considerably simplify the lubricating system and will facilitate the provision of the necessary lubricant feeding passages.

These and other objects and advantages of the invention will appear more clearly from the following specification in connection with the accompanying drawing in which: FIG. 1 illustrates a view of a lubricating arrangement according to the invention in connection with a universal joint shaft. FIG. 2 shows on a larger scale than FIG. 1 a cross section through a lubricating system according to the present invention.

In conformity with the present invention, a stationary lubricant feeding ring is mounted adjacent the flange of the shaft, while feeding passages extend from said lubricant feeding ring through the shaft flange and through the flange of the joint to the anti-friction bearings of the joint pins or pivots. Such an arrangement yields a very simple lubricating system and makes it easy to provide for the necessary lubricant feeding passages, particularly inasmuch as a hollow chamber is normally provided between the flanges of the shaft and of the joint. The said hollow chamber may at the same time serve as lubricant storage chamber. The stationary feeding ring may be provided with grooves for receiving sealing means resting on the shaft end.

Referring now to the drawing in detail, universal joint shaft 1 is in customary manner provided with a flange 2 which latter is connected by means of bolts 3 to the flange 4 of a joint body 5. The joint body 5 has inserted therein a bushing 6 for receiving a needle bearing 7 for the joint pin or pivot 8.

For purposes of feeding the necessary lubricant to this bearing, a stationary lubricant feeding ring 9 is mounted on the shaft end 1, while a lubricant feeding line 11 leads to said ring 9. Said feeding ring 9 is supported by a retaining ring 10. Ring 9 is sealed by sealing rings 12 and 13 arranged in grooves of ring 9 and resting against the shaft end 1. Bores 14 and 15 lead from ring 9 to a hollow chamber 16 provided within the joint body 5. From chamber 16, a passage or conduit 17 feeds the lubricant to an annular passage 18 of the bushing 6, from where the lubricant may pass through individual bores 19 to the needle bearing 7.

Those pivots which do not communicate with the joint body 5 may in a manner known per se be supplied with lubricant through a central passage in the pivot cross.

It is, of course, to be understood that the present invention is, by no means, limited to the particular construction shown in the drawing but also comprises any modifications within the scope of the appended claims.

What I claim is:
1. In combination with a universal joint: a shaft having a flange, a universal joint body also having a flange, said flanges being interconnected to drivingly interconnect said shaft and said body, a lubricant feeding ring having a feeding bore and surrounding and engaging said shaft adjacent the flange of said shaft, said feeding bore being connectible to a lubricant feeding line, a cavity in the region of the center of said body and confined by said shaft, a first passage connecting said cavity to said feeding bore, bearing means carried by said universal joint body and located radially outwardly from said cavity and offset therefrom in axial direction of said body, a second passage leading from said cavity to said bearing means, said shaft having a shoulder engaging said lubricant feeding ring on the flange side thereof, and a locking ring mounted on said shaft and engaging the other side of said lubricant feeding ring.

2. A universal joint arrangement according to claim 1, in which said lubricant feeding ring has annular groove means arranged on the inside of said ring and opening to that surface of said shaft which is surrounded by said ring, and annular sealing ring means disposed in said groove means.

References Cited in the file of this patent
UNITED STATES PATENTS

| 2,078,739 | Slaght | Apr. 27, 1937 |
| 2,244,380 | Warner | June 3, 1941 |
| 2,788,861 | Wutscher | Apr. 16, 1957 |
| 2,925,885 | White | Feb. 23, 1960 |

FOREIGN PATENTS

| 154,520 | Australia | Dec. 15, 1953 |